J. W. DAWSON.
CONVEYER.
APPLICATION FILED MAY 12, 1910.
1,027,036.
Patented May 21, 1912.
2 SHEETS—SHEET 2.
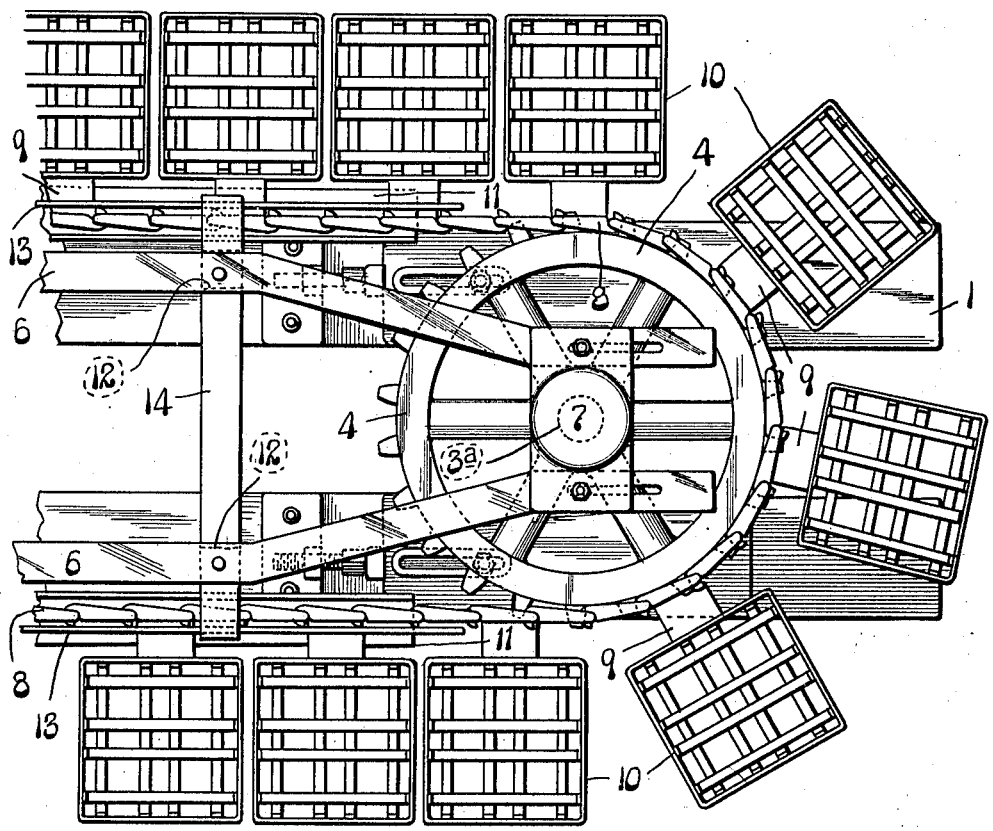
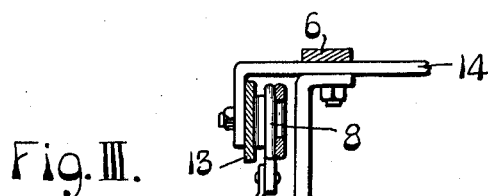
Attest
A. J. McCauley
E. B. Lunt
Inventor:
J. W. Dawson
by E. J. Smith
Atty.

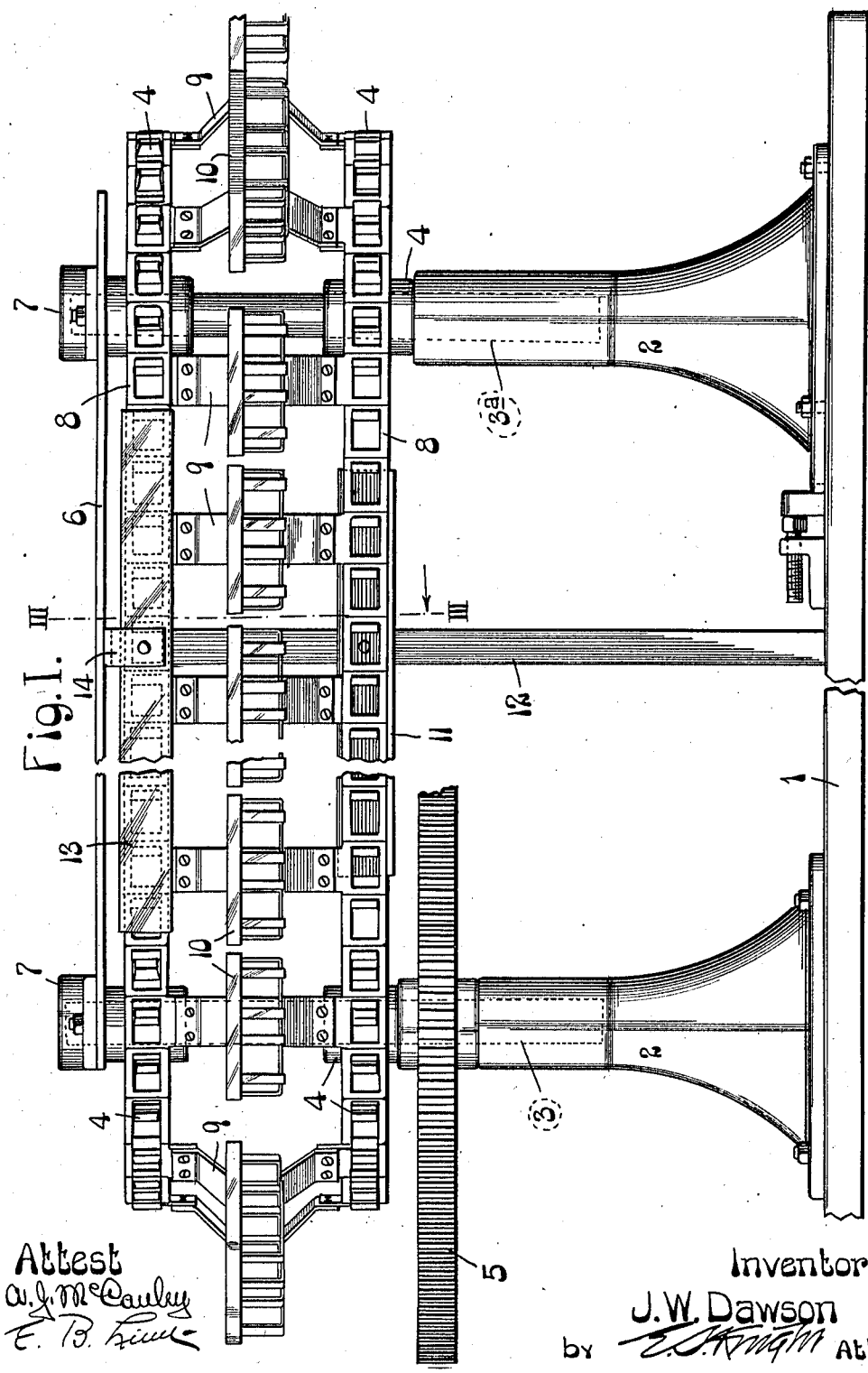

UNITED STATES PATENT OFFICE.

JOSEPH W. DAWSON, OF ST. LOUIS, MISSOURI, ASSIGNOR TO BARRY-WEHMILLER MACHINE COMPANY, OF ST. LOUIS, MISSOURI, A CORPORATION.

CONVEYER.

1,027,036. Specification of Letters Patent. Patented May 21, 1912.

Application filed May 12, 1910. Serial No. 560,770.

*To all whom it may concern:*

Be it known that I, JOSEPH W. DAWSON, a citizen of the United States of America, residing in the city of St. Louis and State of Missouri, have invented certain new and useful Improvements in Conveyers, of which the following is a full, clear, and exact description, reference being had to the accompanying drawings, forming part of this specification.

My invention relates to a conveyer, or carryall, more particularly adapted for use in bottling plants wherein it is desired to convey bottles from one machine to another. It will, however be understood that the invention is not in any way limited to such use.

One of the objects of this invention is to produce a very simple endless conveyer having horizontally movable carriers that may be filled or emptied at any point throughout their path of travel, and which will retain the bottles, or other articles, in the carriers until they are manually removed therefrom.

Figure I is a side elevation, partly broken out, of my conveyer. Fig. II is a plan view of one end of the conveyer; and Fig. III is a vertical section taken approximately on line III—III, Fig. I.

In the accompanying drawing:—1 designates a base plate surmounted by standards 2 which provide bearings for vertical shafts 3 and 3ª. Sprocket wheels 4 are secured to the shafts 3 and 3ª and the shaft 3 has secured to it a gear wheel 5 that may be rotated by any suitable means. Bars 6, which extend longitudinally of the apparatus support bearings 7 that receive the upper ends of the vertical shafts 3 and 3ª. These bars rest upon cross-bars 14 which in turn are supported by vertical bars 12 rigidly supported in turn preferably by having their lower ends resting upon the base plate 1.

8 designates horizontally movable endless link belts arranged one above the other and in mesh with the sprocket wheels 4. These link belts are connected and spaced apart by upright bars 9, each of said bars being bent into the form shown in Fig. III to have a portion intermediate its ends projecting laterally beyond the guide rails 11 and 13 to be again referred to. Brackets or carriers 10 are secured to the projecting portion of said bars. By referring to Fig. III, it will be seen that these carriers extend outwardly from the bars 9 and, therefore, tend to move the link belts laterally in opposite directions, the upper belt tending to move outwardly, while the lower belt tends to move inwardly.

To support the belts intermediate the sprocket wheels and prevent them from shifting laterally, I provide a set of horizontal guides on each side of the apparatus. The inner and lower faces of the lower link belt coöperate with the lower substantially L-shape guides 11, secured to vertical bars 12 mounted on the base plate. The upper link belt is prevented from moving outwardly by horizontal guides 13, which coöperate with the outer face of said belt, said guides being secured to a bar 14 which extends across the apparatus and is connected to the upper ends of the bars 12.

It will be seen that by the construction set forth, the endless belts located one above the other and by which the carriers 10 are supported, the belts are held definitely spaced apart; further, that the lower belt, by resting upon the horizontal wing of the guide 11, is adequately supported intermediate of the sprocket wheels 4, and the upper belt is in turn supported by the upright bars 9 to prevent sagging thereof, thus providing for the carriers 10 being constantly held in the same horizontal line. This being true and the belts being prevented from moving out of their proper paths, due to their riding against the upright wings of the guides 11 and the guides 13, there is no opportunity for the carriers 10 to swing into any position other than a horizontal one and the belts are confined aside from the sprocket wheels in their movements to paths that are permissible and provided for by the guides against which the belts ride.

I claim:—

In a device of the character described, the combination with sprockets arranged in pairs, on spaced vertical axes, of a pair of parallel endless chain belts carried by said sprockets, a pair of vertical supports disposed on opposite sides of the plane of said axes, a transverse member provided with deflected ends depending outside of the lateral run of said endless belts, guide rails for the upper belt secured to said deflected ends, angle bars carried by said supports intermediate of the lower sprockets, vertical connecting bars connecting corresponding links in said endless belts, and a laterally projecting carrier secured to each connecting bar.

JOSEPH W. DAWSON.

In the presence of—
M. C. HAMMON,
E. B. LINN.